INVENTOR.
JOHN A. MARKSTRUM
BY
ATTYS

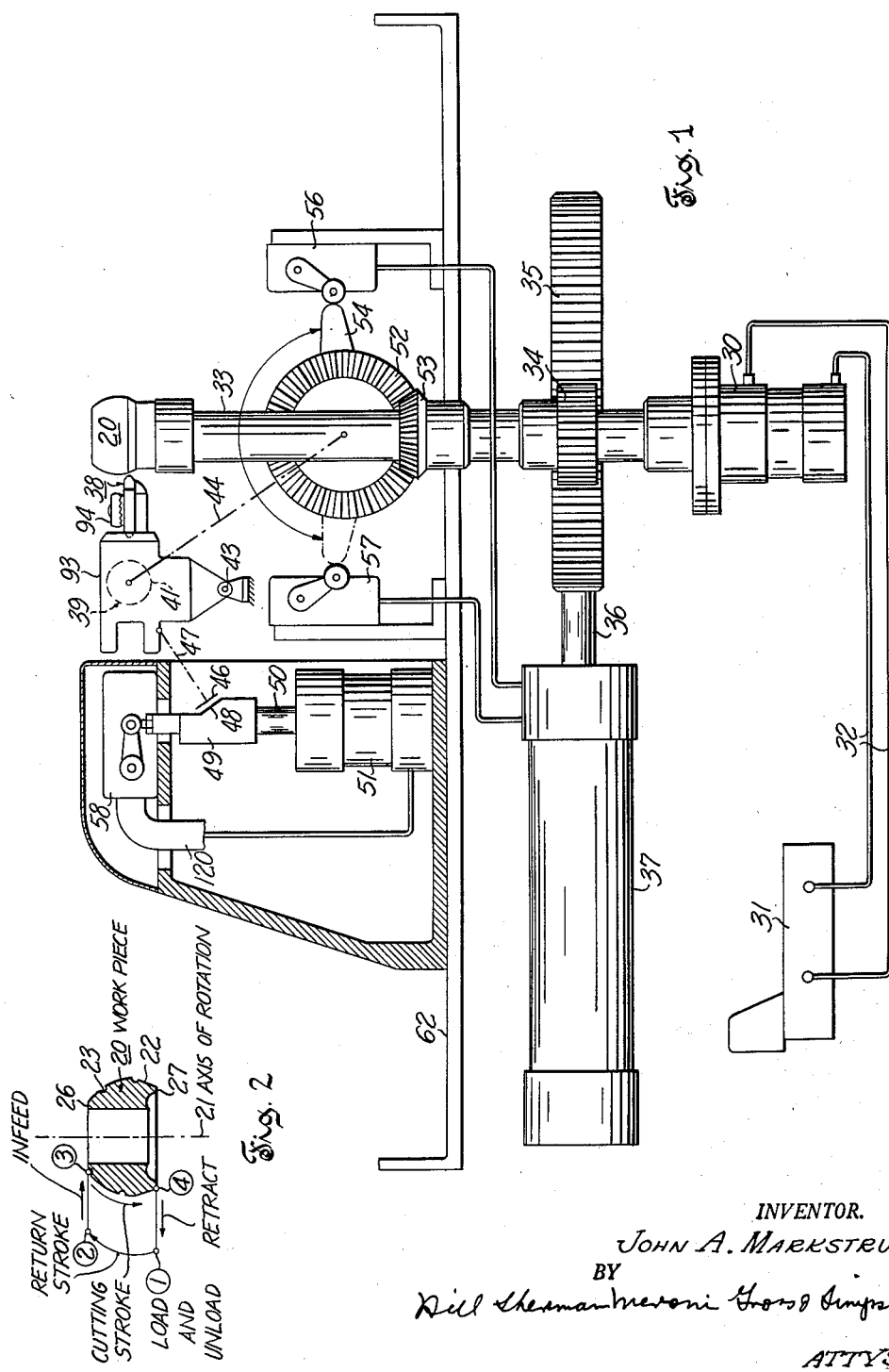

INVENTOR.
JOHN A. MARKSTRUM
BY
ATTYS.

Jan. 6, 1959 J. A. MARKSTRUM 2,867,145
APPARATUS AND METHOD OF MAKING A SPIRALLY
GROOVED BALL TYPE BEARING MEMBER
Filed May 29, 1953 9 Sheets-Sheet 9

INVENTOR.
JOHN A. MARKSTRUM
BY
ATTYS.

United States Patent Office 2,867,145
Patented Jan. 6, 1959

2,867,145

APPARATUS AND METHOD OF MAKING A SPIRALLY GROOVED BALL TYPE BEARING MEMBER

John A. Markstrum, Detroit, Mich., assignor to Thompson Products, Inc., Cleveland, Ohio, a corporation of Ohio Application May 29, 1953, Serial No. 358,471

4 Claims. (Cl. 82—12)

The steering mechanisms of automotive vehicles advantageously employ ball type bearing members having a peripheral bearing surface formed in the contour of a curved plane prescribed by the revolution of a curvilinear generatrix about a fixed axis.

This invention relates generally to ball type bearing members of such description and more particularly relates to a ball type bearing member having a plurality of spirally formed grooves cut in the curved peripheral surface for lubrication purposes.

This invention further relates to apparatus and methods of cutting the spiral grooves in the generated curved surface of the bearing member.

The disclosure of the present application for patent constitutes a continuation-in-part of the disclosure contained in my copending application Serial No. 332,682, filed January 22, 1953.

According to the general principles of the present invention, a plurality of circumferentially spaced lubrication grooves are provided in the peripheral surface of an annular ball type bearing member having a peripheral contour prescribed by the revolution of a generatrix about a fixed axis. A bearing member and a plurality of circumferentially spaced cutting tools are held in engagement with one another at equidistant points on the peripheral surface of the bearing member whereupon the bearing member and the cutting tools are relatively translated in a plane extending through the rotational axis of the bearing member to trace a plurality of points each having movement of uniform velocity along a generatrix of the peripheral surface. Concurrently, the bearing member is rotated about the fixed axis at a uniform angular velocity and the two separate relative movements of the cutting tools and the bearing member are synchronized so that the resultant movement between the various cutting tools and the bearing member will provide a plurality of equidistant circumferentially spaced spiral grooves lying in a curved plane.

In accordance with the principles of the present invention, the ball type bearing member produced in accordance with the practice of the methods disclosed and with the apparatus disclosed will have a plurality of circumferentially spaced spiral grooves so formed in the peripheral surface of the bearing member that lubricant sources will be provided in uniformly spaced relation over the entire bearing area, the lubricant grooves being arranged in generally transverse alignment to any normal pivotal movement of the bearing member in ordinary use.

More specifically, the grooving apparatus provided in accordance with the principles of the present invention utilizes a tool holder which takes the form of a rotatable shaft having a crank-shaped arm at one end thereof adapted to carry a cutting tool through a predetermined arc. A support member journals the shaft for rotation and, in turn, is pivotally supported to pivotally reciprocate the crank arm through a substantially translatory stroke extending generally transversely of the predetermined arc.

A workpiece holder comprising a collet having expanding fingers for engaging the bore walls of an annular bearing member of the type described herein is located adjacent the arm on one end of a rotatable shaft, the shaft and the collet being arranged for rotation on an axis of rotation generally transverse to the axis of rotation of the tool holder shaft.

A train of gears is located between the workpiece holder shaft and the tool holder shaft so that both shafts may be synchronously rotated in unison with one another.

Actuating means are also provided for selectively reciprocating the support member toward and away from the workpiece holder.

To regulate the rotation of the various shafts and to regulate the operation of the actuating means, control means are provided so that the cutting tool carried by the cutting tool holder may be cycled relative to the workpiece holder through a curved cutting stroke, a substantially linear retraction stroke, a curved return stroke and a substantially linear in-feed stroke.

It is contemplated in accordance with the principles of the present invention to provide a common hydraulic system for providing the motive force to each of the various actuating means so that the mechanism can be effectively operated by hydraulic control means.

Since the present invention contemplates the utilization of a plurality of circumferentially spaced cutting tool holders adapted to engage equidistant points on the peripheral surface of the workpiece, it will be evident that the relative movement between the workpiece and the various cutting tools will result in a pivotal reciprocation between top and bottom positions forming the limits of a confined path of movement complementary to an arc drawn on the peripheral surface of the workpiece and lying in a plane including the rotational axis of the collet and of the workpiece. It may be noted that if the curved peripheral surface of the workpiece is not truly spherical, so that the transverse axis referred to above and the rotational axis of the workpiece cross one another in a common plane, then the transverse axis will be generally tangent to a radius locus circle spaced radially concentrically outwardly of the rotational axis.

The two components of motion provided by the simultaneous movement of the plurality of cutting tool holders and the rotation of the workpiece result in the development of a plurality of traced spiral paths between the peripheral surface of the workpiece and the plurality of cutting tools. There is thus provided simultaneously a plurality of equidistant spiral grooves in the curved plane of the peripheral surface of the workpiece.

It is believed that the methods of the present invention will become manifest to those versed in the art upon reading the detail description of the apparatus provided for practicing the principles of the present invention.

It is an object of the present invention to provide a ball type bearing member having a curved peripheral surface with spiral lubrication grooves and an improved apparatus and method of cutting the spiral grooves in a surface lying on a curved plane.

Another object of the present invention is to provide a spiral grooving machine wherein a plurality of circumferentially spaced spiral grooves may be cut simultaneously in a curved surface of generation.

A further object of the present invention is to provide a grooving machine which can be controlled and actuated by means of a hydraulic system.

Yet another object of the present invention is to provide a grooving machine fabricated from a reduced number of simplified components which is economical to make and which may be effectively maintained with a minimum of servicing.

A further object of the present invention is to provide apparatus and methods of cutting spiral grooves in a surface lying in a curved plane which can be readily and conveniently practiced and operated by relatively unskilled personnel.

Many other features, advantages and additional objects of the present invention will become manifest to those skilled in the art upon making reference to the detail description which follows and the accompanying sheets of drawings in which a preferred structural embodiment of the principles of the present invention is shown by way of illustrative example only.

On the drawings:

Figure 1 is a diagrammatic view of a spiral grooving machine provided in accordance with the principles of the present invention;

Figure 2 is a cross-sectional view of a workpiece provided in accordance with the principles of the present invention showing in diagrammatic form the operating cycle of the apparatus shown diagrammatically in Figure 1;

As shown on the drawings:

Figure 14:
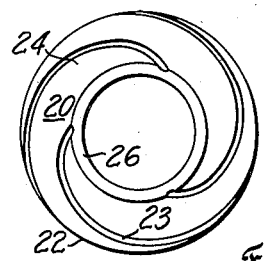
Figure 14 is a plan elevational view of a ball type bearing member provided in accordance with the principles of the present invention.
Figure 15:
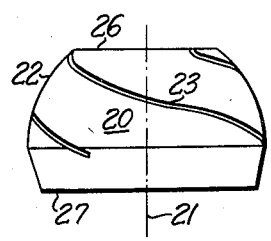
Figure 15 is an elevational view of the ball type bearing member shown in Figure 14.

In Figures 2, 14 and 15, there is shown a ball type bearing member comprising an annular ring shaped workpiece 20 having a center axis 21 and including an arcuately curved peripheral bearing surface 22 which is symmetrical about the axis 21.

The entire peripheral surface of the bearing member or workpiece 20 can be considered a peripheral contour prescribed by the revolution of a generatrix about the axis 21, at least a portion of the generatrix being curvilinear to form the curved bearing surface 22.

In accordance with the principles of the present invention, a plurality of circumferentially spaced spiral grooves 23 are formed in the curved peripheral surface of bearing surface 22. In the prefererd embodiment herein shown, each of the spiral grooves 23 is equidistant from the other and spaced at 120° intervals so as to provide bearing surface areas 24 (Figure 14) between the grooves which are also spirally or helically shaped and which are of uniform width.

By providing the uniformly spaced spiral grooves 23, an adequate lubricant source is located on the bearing surface 22 and the groove sources extend generally transversely to the normal direction of tilting movement of the ball type bearing member 20 in ordinary usage. Furthermore, the spiral grooves adequately cross any possible rotational movement of the bearing surface 22 so that full lubrication effectiveness of the grooves is insured under all ordinary conditions of usage.

It will be noted that in the particular embodiment herein shown and described, the ball member 20 has a top portion 26 and a bottom portion 27 which lie on spaced parallel planes normal to the axis 21 and the grooves 23 run out of the arcuately curved peripheral bearing surface 22 to insure a full supply of lubricant throughout the entire length of each of the grooves 23.

In accordance with the principles of the present invention, three equidistant grooves 23 are formed in the peripheral surface 22 by holding the bearing member and a plurality of circumferentially spaced cutting tools in engagement with one another at three equidistant points on the bearing surface 22 whereupon the bearing member and the cutting tools are relatively moved to trace each of the points with a movement of uniform velocity along a generatrix of the peripheral surface 22. The bearing member or workpiece 20 is simultaneously revolved about the fixed axis 21 at a uniform angular velocity.

Referring first of all to the diagrammatic view of Figure 1, the apparatus provided in accordance with the principles of the present invention may be briefly described. The workpiece 20 is clamped by an expanding collet actuated by a hydraulic mechanism 30. A solenoid operated hydraulic valve regulator is indicated at 31 and is connected to the hydraulic device 30 by means of conduit means 32. The workpiece 20 being clamped in firm assembly on the collet is selectively rotated in different angular directions by the shaft 33, a pinion 34 being connected to the shaft 33 and meshing with a rack 35 carried on the end of a piston rod 36 forming part of a piston type hydraulic motor 37.

Upon actuating the hydraulic motor 37, the shaft 33 and the workpiece 20 may be selectively rotated through a predetermined arc.

A plurality of cutting tools are provided to be operated in unison for cutting three grooves in the workpiece 20 simultaneously and one of the cutting tools is indicated in Figure 1 by the reference numeral 38 being held in a tool holder 93 which is attached to a crank arm 40 on the end of a rotatable shaft 41 journaled for selective rotation in a bracket 42, itself pivotally mounted for pivotal movement around a pivot axis 43.

By translating the cutting tool 38 around the curved surface of the workpiece 20 in a plane extending through the rotational axis of the shaft 33 coincident with axis of the workpiece 20 and by synchronously rotating the workpiece 20 on the shaft 33, a spiral path will be traced between the cutting tool 38 and the peripheral surface of the workpiece 20.

To rotate the cutting tool 38 in the manner prescribed, a gear train 44 is connected between the shaft 33 and the shaft 41.

To retract the cutting tool 38 away from the workpiece and to feed the cutting tool 38 in toward the workpiece 20, the bracket means 42 is provided with a camming member 46 connected to the bracket means 42 by a mechanical connection indicated at 47 and cooperating with a cam surface 48 provided on a plunger 49 carried by a piston rod 50 forming part of a piston type hydraulic motor 51.

The gear train 44 includes a bevel gear 52 meshing with a bevel gear 53 on the shaft 33. A radially extending abutment member 54 engages the respective actuating arms of a first limit switch 56 and a second limit switch 57 controlling the hydraulic motor 37. A limit switch 58 cooperates with the plunger 49 to regulate the hydraulic motor 51.

By referring to Figure 2 in connection with Figure 1, a typical operating cycle may be explained.

In the number 1 position the workpiece 20 may be loaded or unloaded from the collet on the shaft 33, the bracket means 42 being retracted so as to move the cutting tool 38 away from the workpiece 20 and the shaft 41 being in such position that the crank arm 40 carries the cutting tool 38 at the lowermost portion of the workpiece 20.

On the return stroke, the shaft 41 is rotated so as to move the crank arm through a predetermined arc and carrying the cutting tool 38 to the uppermost position relative to the workpiece 20. The hydraulic motor 51 is then actuated so as to move the plunger 49 whereupon the bracket means 42 will be pivoted around the axis 43 and the cutting tool 38 will move through the in-feed stroke into engagement with the peripheral surface of the workpiece loaded on the collet on the end of the shaft 33.

The hydraulic motor 37 is then actuated to simultaneously rotate the shaft 33 and the shaft 41 through the gear train 44 whereupon the cutting tool 38 will be moved through the cutting stroke between position number 3 and position number 4 to trace a spiral path on the peripheral surface of the workpiece 20. The cycle is then repeated upon retraction of the bracket means 42.

The structural details of a commercial machine embodying the principles illustrated diagrammatically in Figures 1 and 2 will now be described in connection with the other drawing figures. Like reference numerals will be applied wherever appropriate.

Figure 3:
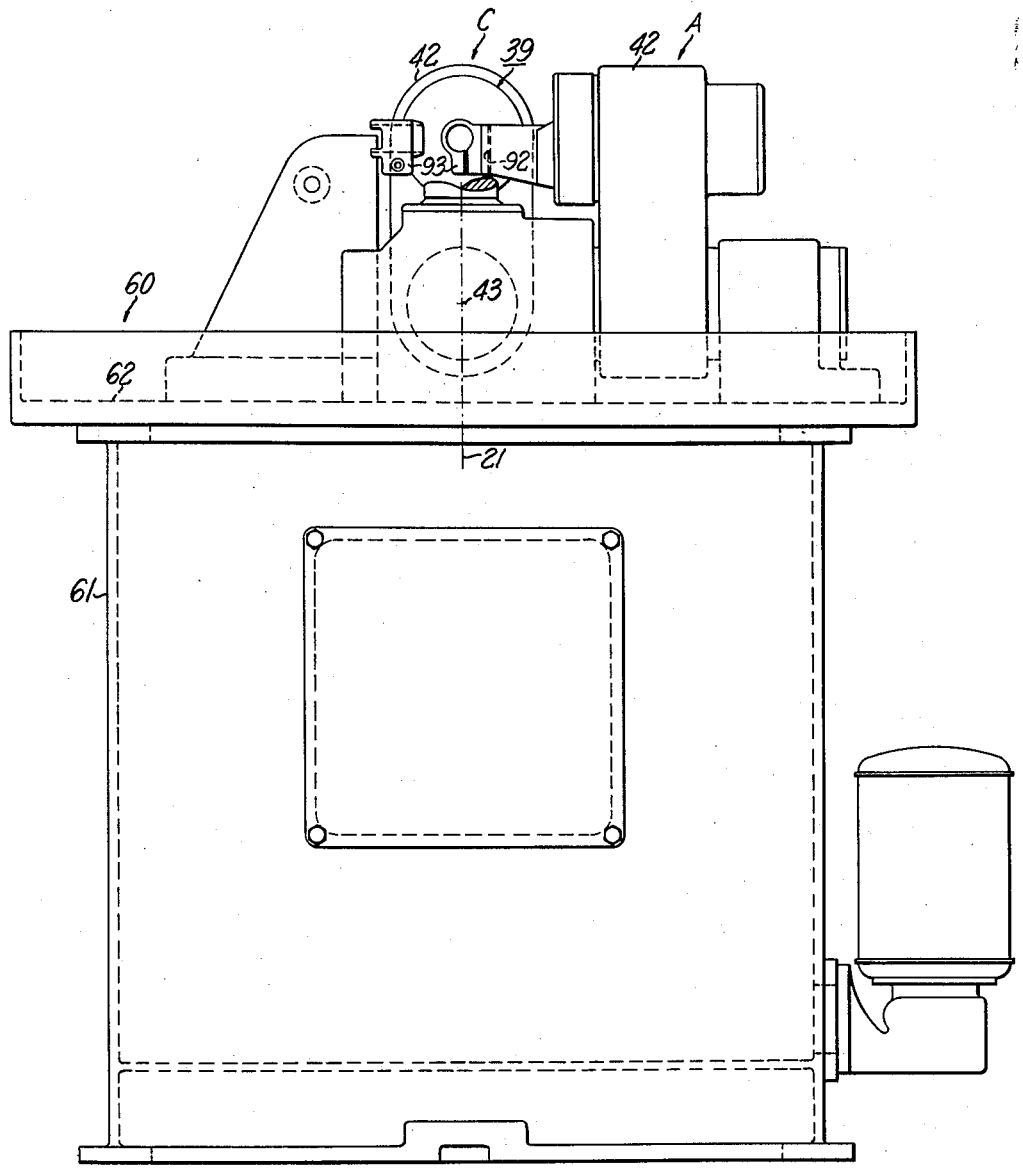
Figure 3 is an elevational view with parts removed showing a spiral grooving machine provided in accordance with the principles of the present invention.
Figure 4:
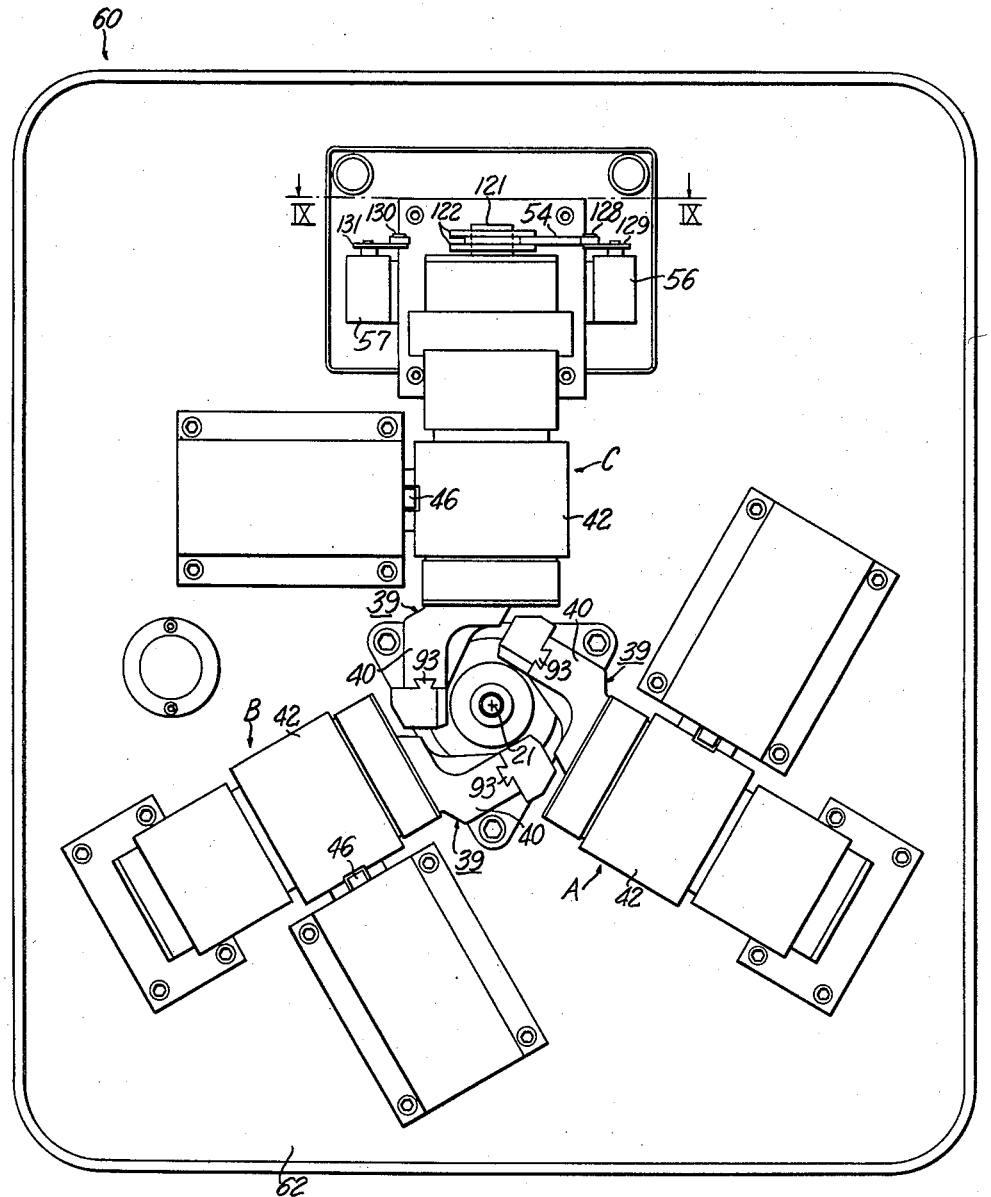
Figure 4 is a plan elevational view of the machine shown in Figure 3.

As shown in Figures 3 and 4, a spiral grooving machine is indicated generally by the reference numeral 60 and comprises a frame 61 having a table top 62 providing a flat horizontal support plane.

The plane of the table top 62 is intersected by a vertical axis which is identified in the drawings by the reference numeral 21 since this axis will be shown to be coincident with the rotational axis of the shaft 33 and the axis of the workpiece 20.

Radially outwardly of the axis 21 and spaced in equidistant circumferentially spaced apart alignment are a plurality of cutting tool stations indicated generally by the reference characters A, B and C.

Each of the cutting tool stations A, B and C comprises identical structural components and, accordingly, a detailed description of only one of the cutting tool stations should be sufficient for the purpose of the present disclosure.

Figure 6:
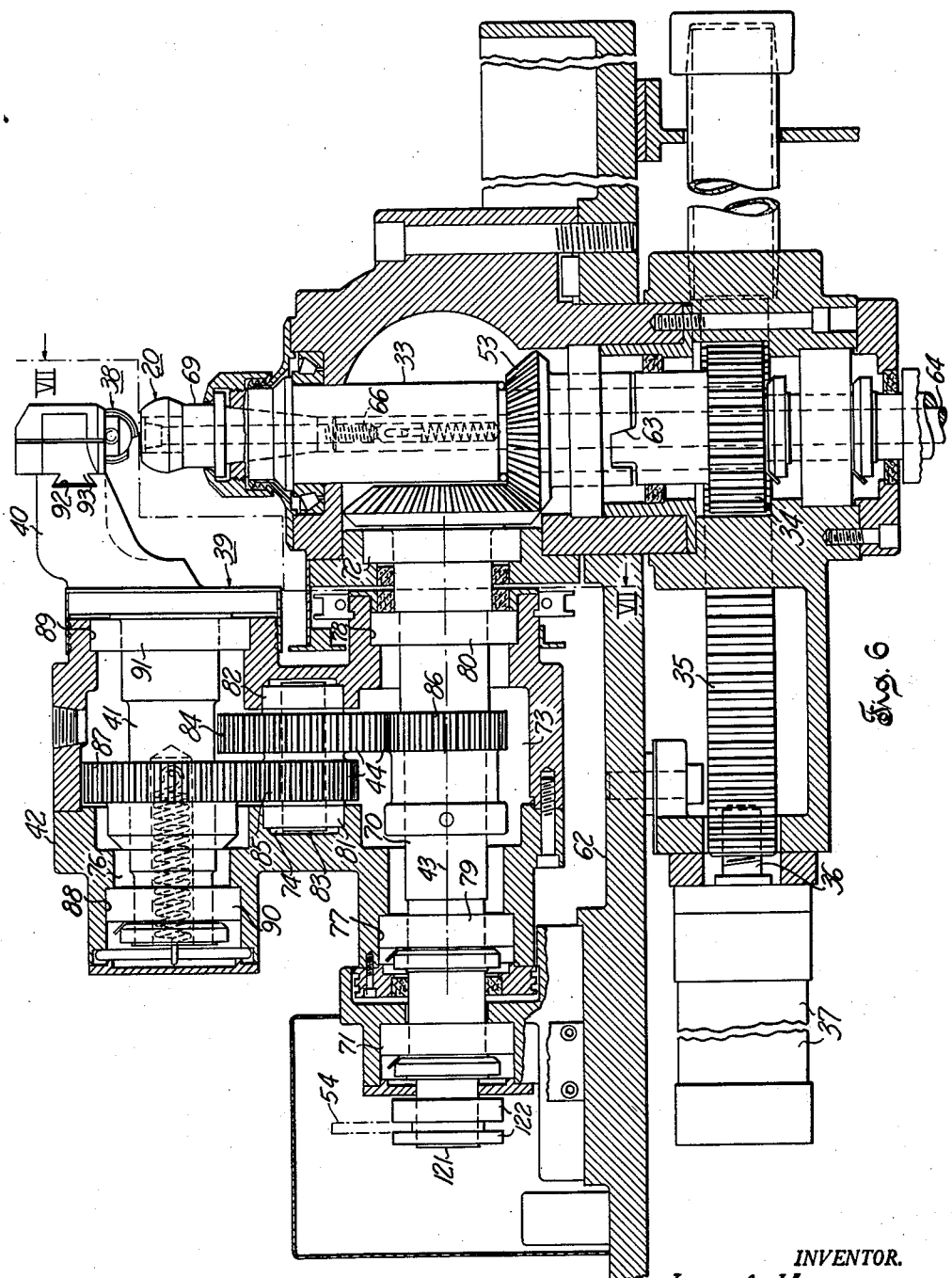
Figure 6 is a cross-sectional view taken substantially on line VI—VI of Figure 5 but with parts removed and broken away for the sake of clarity and with parts in changed position.

In Figure 6, the shaft 33 is shown connected to the gear 34 for actuation by the hydraulic motor 37 through the rack 35. The shaft 33 is shown as including a clutch 63 provided to take backlash out of the various keys utilized in locking the hubs of the gear 34 and the bevel gear 53 to the shaft 33 in co-rotation therewith.

A piston rod 64 extends through the center of the shaft 33 and forms a part of the hydraulic motor 30. The piston rod 64 is connected to a threaded plunger rod 66 (Figures 6 and 8) having a wedge 67 on the end thereof for spreading a plurality of fingers 68 radially outwardly into clamping engagement with the workpiece 20, the fingers 68 being arranged in upstanding circumferentially spaced alignment and forming part of a collet 69 forming the workpiece holder for the workpiece 20 and being connected in the usual manner for co-rotation with the shaft 33.

A shaft 70 is located on the pivot axis 43 and carries the bevel gear 52 on one end thereof for meshing engagement with the bevel gear 53 on the rotatable shaft 33. It will be noted that the shaft 70 extends generally at right angles to the shaft 33 and is journaled for rotation by spaced apart bearing means indicated at 71 and 72 carried by the frame 61.

The bracket means 42 takes the form of a hollowing casing-like structure, being provided with three bores or recesses spaced apart from one another and indicated by the reference numerals 73, 74 and 76, respectively (Figure 6).

The bore 73 is counterbored at opposite ends thereof as at 77 and 78 to receive a bearing 79 and a bearing 80, respectively, the inner portions of which engage the shaft 70, thereby to pivotally mount the bracket means 42 for pivotal movement relative to the pivot axis 43.

The recess 74 carries a pair of spaced apart bearings 81 and 82 journaling a shaft 83 carrying a pair of spaced apart gears 84 and 85 adapted to effect a gear reduction. The gears 84 and 85 are idler gears, the gear 84 meshing with a gear 86 carried on the shaft 70 and the gear 85 meshing with a gear 87 carried on the shaft 41.

The bore or recess 76 is counterbored at opposite ends thereof as at 88 and 89 to receive spaced apart bearings 90 and 91 journaling the shaft 41 for rotation in the bracket means 42. At one end of the shaft 41, the crankarm 40 extends outwardly of the bracket means 42.

It will be understood that each of the cutting tool stations A, B and C has a bevel gear corresponding to the bevel gear 52 meshing with the bevel gear 53 carried by the shaft 33 so that rotation of the shaft 33 will effect unison rotation of all of the gear trains 44 and hence the unison rotation of all of the cutting tools 38.

It will further be evident that the gears 52, 53, 86, 84, 85 and 87 are selected as to size and number of teeth to synchronously interconnect the shaft 41 and the shaft 33 so that the cutting tool 38 will be rotated through the requisite arc, thereby to trace a point with a movement of uniform velocity along a generatrix of the peripheral surface 22 of the workpiece 20. The mechanical interconnection effected by the gear train further facilitates simultaneous rotation of the shaft 33 and hence of the workpiece 20 about the fixed axis 21 at uniform angular velocity through a predetermined arc.

The details of construction of the tool holder 39 and of the cutting tool 38 may be seen in greater detail in Figures 10, 11, 12 and 13, the holder 39 including the crankarm 40 offset from the rotational axis of the shaft 41 and having a dovetail recess 92 receiving a complementary shaped rib 93 on a tool holder clamp 94 (Figure 6).

The cutting tool of the illustrative embodiment and indicated by the reference numeral 38 comprises a lathe-type cutting tool having a cutting point 96 which can be resharpened within the limits prescribed by an annular knife edge 97 extending substantially around a periphery of a disk-shaped body member 98.

A central hub portion 99 provides a serrated surface 100 on one side to cooperate with a similarly shaped retaining member carried by the tool holder clamp 94.

To effect pivotal movement of the bracket means 42 through a substantially translatory stroke toward and away from the working area, the hydraulic actuated means including the hydraulic motor 51 is provided.

Figure 5:
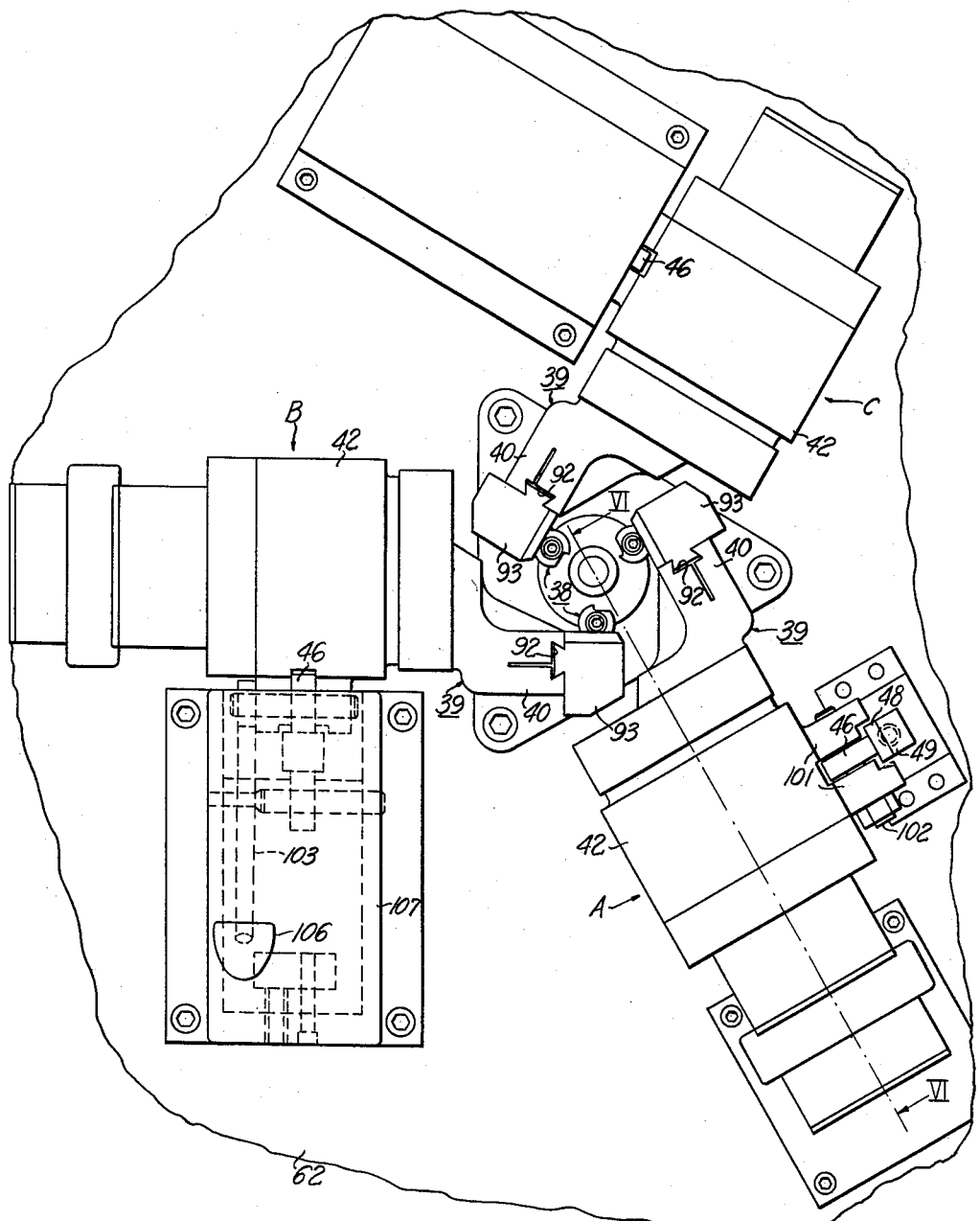
Figure 5 is an enlarged fragmentary view similar to Figure 4 but showing additional details of construction.
Figure 7:
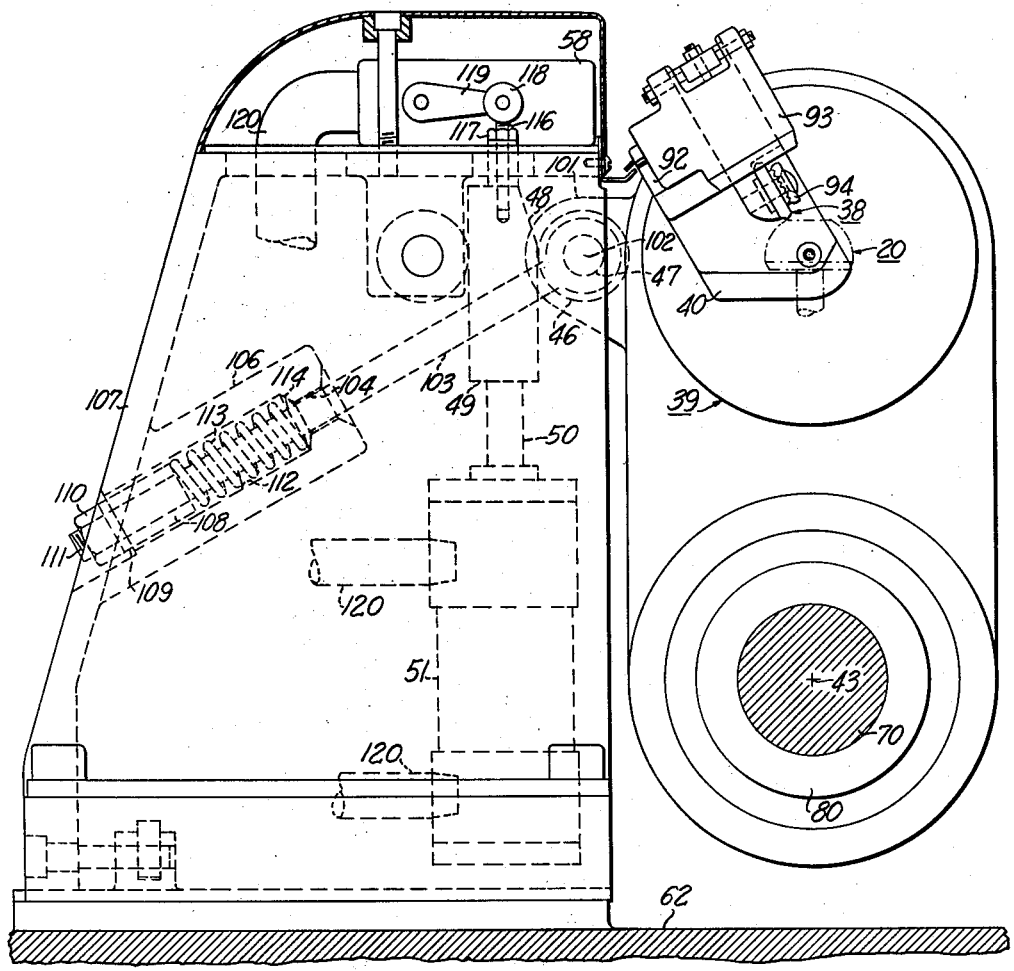
Figure 7 is a fragmentary cross-sectional view with parts shown in elevation and with parts removed taken substantially on line VII—VII of Figure 6.

As shown in Figures 5 and 7, a bifurcated boss 101 extends from one side of the bracket means 42 and receives a pivot pin 102 carrying a cam ring providing the camming surface 46, such ring being indicated by the reference numeral 46 for purposes of clarity.

A link arm 103 is connected to the pin 102 and extends downwardly away from the bifurcated boss 101 through an aperture 104 provided in a boss 106 formed in a frame bracket 107 carried on the table top 62 of the frame 61.

A stop ring 108 is carried on the end of the link arm 103 and is retained thereon by a lock washer 109 engaged by a fastening nut 110 turned on the threaded end 111 of the link arm 103. The stop ring 108 substantially closes a cylindrical recess 112 formed in the boss 106 and forming an extension of the aperture 104 so that a coil spring 113 received in the cylindrical recess 112 may be bottomed at one end against the stop ring 108 and against an annular shoulder 114 at the other end lying between the aperture 104 and the end of the cylindrical recess 112.

The coil spring 113 acts as a continuous biasing means and exerts a continuous load on the link arm 103 for pivotally moving the bracket means 42 in one direction. In the preferred embodiment herein disclosed, the bracket means 42 are biased so that the cutting tool 38 will be normally moved away from the working area directly adjacent the workpiece 20.

The plunger 49 moves on an axis which is substantially parallel to the rotational axis 21 of the shaft 33 and includes the cam surface 48 which is tapered so as to lie in a plane intersecting the axis of plunger movement. The cam surface 48 on the plunger 49 engages the cam surface 46 provided by the cam ring and is so arranged that upward movement of the plunger 49 will pivotally displace the bracket means 42 against the biasing force exerted by the coil spring 113 whereupon the cutting tool 38 will be pivotally reciprocated through a substantially translatory stroke toward and away from the workpiece 20 as the plunger 49 moves upwardly and downwardly.

A set screw 116 projects out of the top of the plunger 49 and is threadedly engaged therewith so that the effective length of the set screw 116 may be selected and locked by means of lock nut means indicated at 117. The set screw 116 is arranged to engage a roller 118 carried on the end of an actuating arm 119. The length of the srtoke or plunger 49 is controlled and hence the amount of in-feed of the cutting tool 38, which is a function of the pivotal movement of the bracket means 42 relative to the axis 43. It will be understood that the limit switch 58 controls the hydraulic motor 37 to engage it into the cutting stroke at the uppermost position of cam 49 by means of appropriate relays and solenoid valving, the structural details of which do not appear to be necessary to the understanding of this invention.

Figure 9:
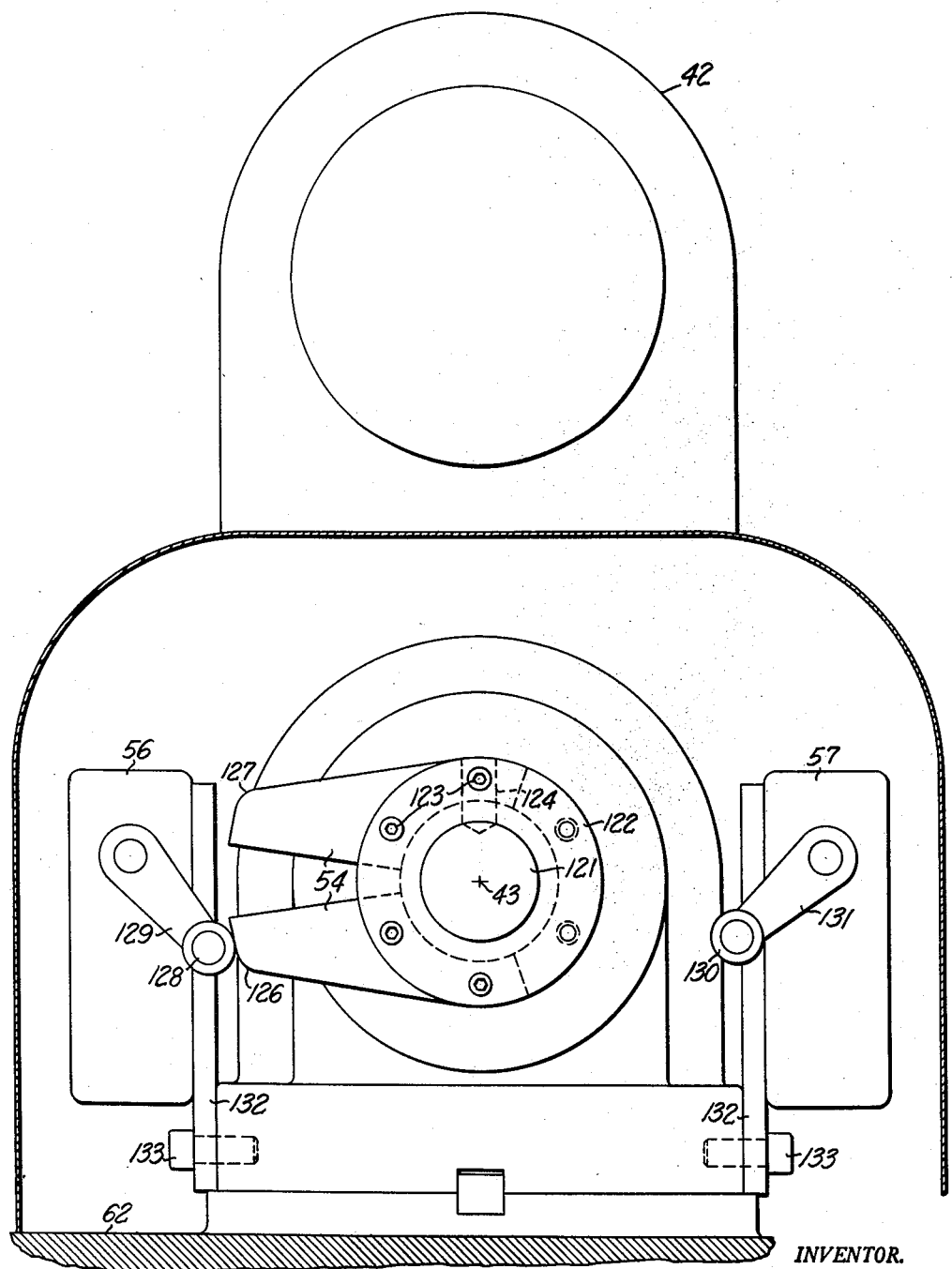
Figure 9 is an enlarged fragmentary cross-sectional view with parts shown in elevation taken substantially on line IX—IX of Figure 4.
Figure 10:
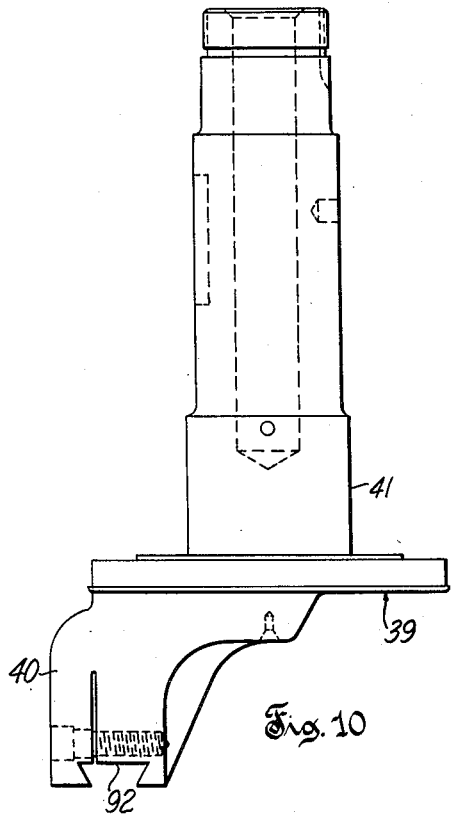
Figure 10 is an elevational view of one component of the tool holder apparatus.
Figure 11:
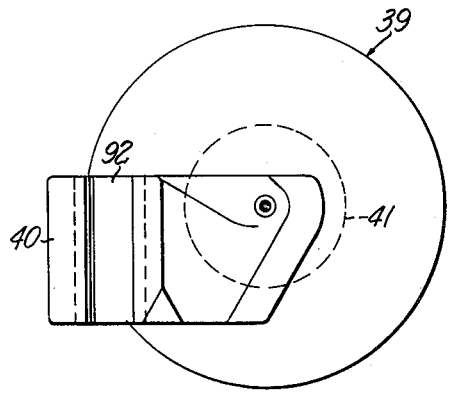
Figure 11 is an end view of the tool holder component shown in Figure 10.
Figure 12:
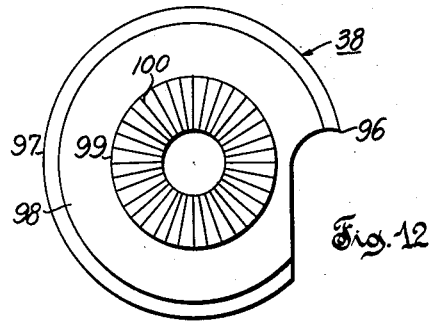
Figure 12 is an elevational view of the cutting tool provided in accordance with the principles of the present invention.
Figure 13:
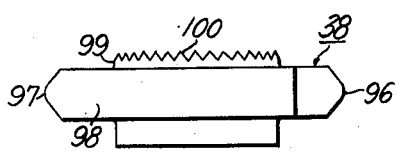
Figure 13 is a side elevational view of the cutting tool shown in Figure 12.

As is shown diagrammatically in Figure 1 and as shown in Figures 4 and 9, one of the cutting tool stations, for example, the cutting tool station C has associated therewith the limit switches 56 and 57 actuated by the arm 54. Referring to Figures 4 and 9 in connection with Figure 6, it will be noted that the shaft 70 is provided with a shaft stub 121 carrying a pair of disks 122 between which is clamped the actuating arm 54, the disks 122 being connected together by a plurality of fasteners indicated at 123. It will be understood that the arm 54 can be located in any selected angular position merely by loosening the fasteners 123, adjusting the position of the arm 54 and tightening the fasteners. The disks 122 are locked for corotation with the shaft stub 121 by means of a retainer indicated at 124. The actuating arm 54 in the present embodiment is shown as comprising two segments each providing an engagement surface 126 and 127, respectively. The surface 126 is shown engaged with a roller 128 carried on the end of an actuating arm 129 forming a part of the limit switch 56 and it will be understood that the engagement surface 127 is adapted for cooperative engagement with a roller 130 carried on the end of an actuating arm 131 forming a part of the limit switch 57.

The limit switches 56 and 57 are aligned on diametrically opposite sides of the shaft 70 and particularly the shaft stub 121 by means of brackets 132 each fastened to the frame 61 by means of appropriate connectors indicated at 133.

The limit switch assemblies 56 and 57 are so arranged and the segments of the arm 54 are selected and positioned between the disks 122 so as to prescribe the limit positions of the confined path of travel of each of the tool holders 39 relative to the workpiece 20. In other words, since each crank arm 40 of the tool holder 39 effects a rotation of the cutting tool 38 on an axis transverse to the rotational axis 21 of the workpiece 20, each cutting tool 38 must be moved through the cutting stroke between a top position and a bottom position forming the limits of a confined path of movement complementary to an arc drawn on the peripheral bearing surface 22 of the workpiece 20. One of the limit switch assemblies 56, 57 is arranged to be actuated so as to stop the hydraulic motor 37 when relative movement of the workpiece or bearing member 20 and the cutting tool 38 is at the bottom position and the other of the limit switch assemblies 56, 57 is arranged to actuate the hydraulic motor 37 when the opposite position is reached.

In operation it will be appreciated that the hydraulic motor 51 actually moves its piston through a full stroke in both directions and the limit of infeed is positive, as the cam surface 48 overtravels the cam ring engagement therewith and the cam ring bears on the portion of the cam that is parallel to the directional travel of 49 and 50, as indicated in Fig. 7. Primary infeed setting (centralizing) is accomplished by loosening clamping screws of frame bracket 107 and adjusting 107 by means of the screw and nut, shown at lower left hand corner of 107 Fig. 7, and locked with an opposing set screw, not shown. Clamp bolts are passed through elongated holes in 107 to permit this adjustment.

It may be further noted that limit switch 58 is repeated in stations A, B and C to prevent premature actuation of hydraulic motor 37. In other words, all three cams must have attained cutting stroke position and tripped their respective switches before the cutting stroke can begin.

Figure 8:
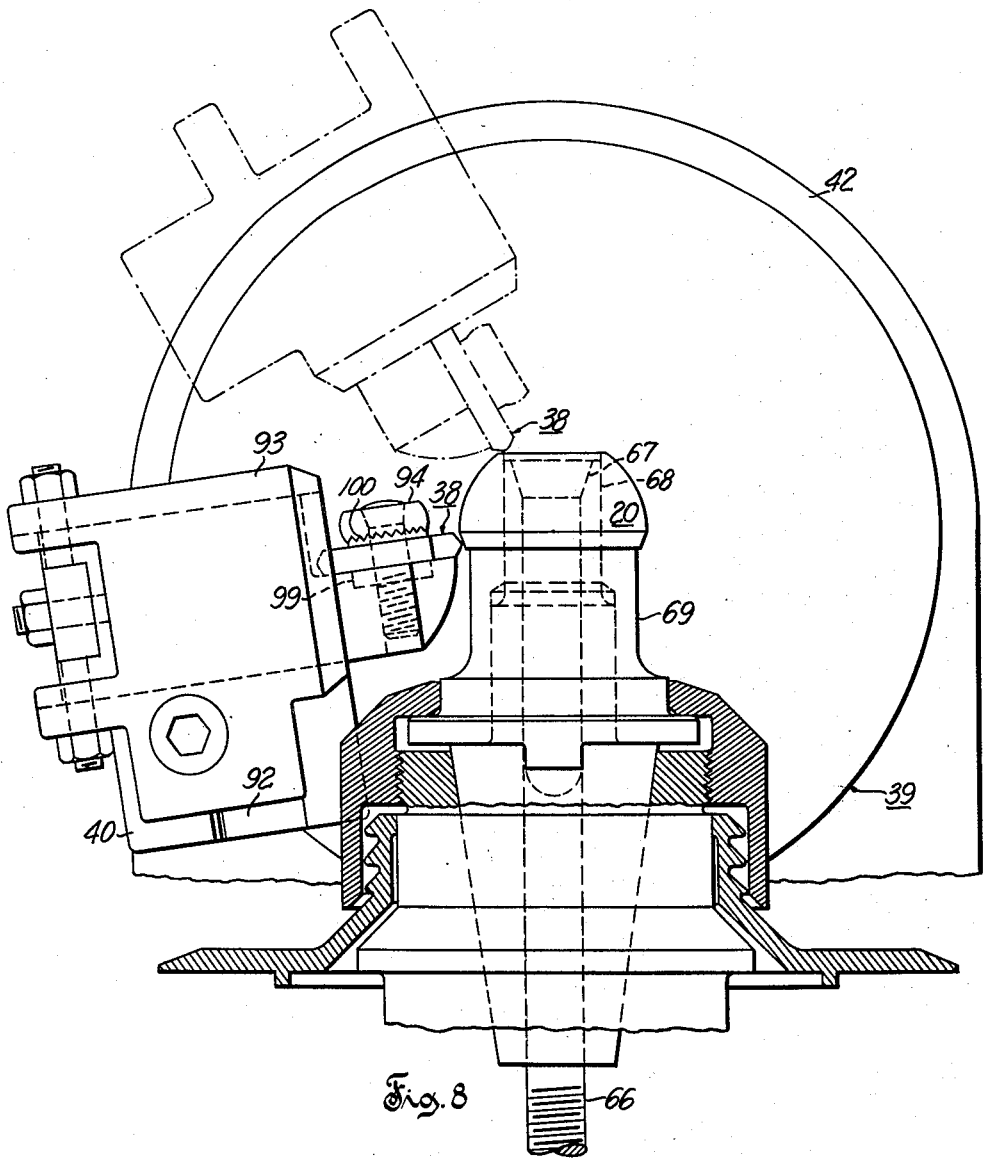
Figure 8 is an enlarged fragmentary cross-sectional view showing additional details of construction of the tool holder and the workpiece holder and illustrating in phantom selected relative positions of the tool holder and the workpiece.

Secondary infeed positioning means are shown at the left in Fig. 8, and are comprised of the horizontal set screw and nut which move the cylindrical adapter, to which tool 38 is fastened, axially toward or away from the workpiece. After the correct position is found and the screw is locked, the cylindrical adapter and tool attached thereto may be removed, sharpened and re-inserted without further infeed adjustment.

The opposed vertical screws and nuts shown at the left in Fig. 8, position the tool 38 radially to correspond to the average angle of the spiral groove in workpiece 20. The spiral is of inconstant angle due to the varying diameters of the workpiece throughout the path of the groove. These vertical screws engage a transversely extended arm keyed to the cylindrical form tool adapter, and are locked with the nuts, permitting withdrawal and re-insertion of form tool and its cylindrical adapter without disturbing either the axial or radial setting.

Although various minor structural modifications might be suggested by those versed in the art, it should be understood that I wish to embody within the scope of the patent warranted hereon such modifications as reasonably and properly come within the scope of my contribution to the art.

I claim as my invention:

1. In combination, a workpiece holder rotatable on an axis of rotation, cutting tool means comprising a rotatable shaft having a crank arm on the end thereof with a cutting tool holder attached to said crank arm, a first support member rotatably mounting said shaft of said cutting tool means for rotation about an axis transverse to said axis of rotation, thereby to pivotally displace the cutting tool holder through a spherical arc, a second support member pivotally mounting said first support member for accommodating movement toward and away from said workpiece holder, actuating means on said second support member engaging said first support member to pivotally move said cutting tool holder toward and away from said workpiece holder, a drive shaft for selectively rotating said workpiece holder through a predetermined arc, a gear train interconnecting said drive shaft of said workpiece holder and said rotatable shaft of said cutting tool means for synchronous movement, a rack and pinion drive connected to said drive shaft to relatively displace said shaft through said predetermined arc, and hydraulic drive means to actuate said rack and pinion drive and to operate said first mentioned actuating means, said workpiece holder comprising an expanding collet, and actuating means connected to said expanding collet operated by said hydraulic drive means.

2. In combination, a workpiece holder rotatable on an axis of rotation, a cutting tool means comprising a rotatable shaft having a crank arm on the end thereof with a cutting tool holder attached to said crank arm, a first support member rotatably mounting said shaft of said cutting tool means for rotation about an axis transverse to said axis of rotation, thereby to pivotally displace the cutting tool holder through a spherical arc, a second support member pivotally mounting said first support member for accommodating movement toward and away from the workpiece holder, actuating means on said second support member comprising a reciprocable plunger having a wedge-shaped camming member engaging a camming surface on said first support member to pivotally move said cutting tool holder toward and away from said workpiece holder and further including an hydraulic piston motor connected to said plunger, a drive shaft for selectively rotating said workpiece holder through a predetermined arc, a gear train interconnecting said drive shaft of said workpiece holder and said rotatable shaft of said cutting tool means for synchronous movement, a rack and pinion drive connected to said drive shaft to relatively displace said shaft through said predetermined arc, and hydraulic drive means to actuate said rack and pinion drive and to operate said hydraulic piston motor.

3. In combination, a workpiece holder rotatable on an axis of rotation, cutting tool means comprising a rotatable shaft having a crank arm on the end thereof with a cutting tool holder attached to said crank arm, a first support member rotatably mounting said shaft of said cutting tool means for rotation about an axis transverse to said axis of rotation, thereby to pivotally displace the cutting tool holder through a spherical arc, a second support member pivotally mounting said first support member for accommodating movement toward and away from said workpiece holder, a drive shaft for selectively rotating said workpiece holder through a predetermined arc, and a gear train interconnecting said drive shaft of said workpiece holder and said rotatable shaft of said cutting tool means for synchronous movement.

4. In combination, a workpiece holder rotatable on an axis of rotation, cutting tool means comprising a rotatable shaft having a crank arm on the end thereof with a cutting tool holder attached to said crank arm, a first support member rotatably mounting said shaft of said cutting tool means for rotation about an axis transverse to said axis of rotation, thereby to pivotally displace the cutting tool holder through a spherical arc, a second support member pivotally mounting said first support member for accommodating movement toward and away from said workpiece holder, actuating means on said second support member engaging said first support member to pivotally move said cutting tool holder toward and away from said workpiece holder, a drive shaft for selectively rotating said workpiece holder through a predetermined arc, and a gear train interconnecting said drive shaft of said workpiece holder and said rotatable shaft of said cutting tool means for synchronous movement.

References Cited in the file of this patent

UNITED STATES PATENTS

| 124,272 | Hudson | Mar. 5, 1872 |
| 1,252,129 | McLachlan | Jan. 1, 1918 |
| 1,663,192 | Compton | Mar. 20, 1928 |
| 1,858,754 | Tessky | May 17, 1932 |
| 1,859,006 | Schaad | May 17, 1932 |
| 1,879,196 | Greene | Sept. 27, 1932 |
| 1,960,460 | Schurr | May 29, 1934 |
| 2,114,627 | Carlsen | Apr. 19, 1938 |
| 2,146,774 | Snader | Feb. 14, 1939 |
| 2,215,257 | Svenson | Sept. 17, 1940 |
| 2,232,304 | Baker | Feb. 18, 1941 |
| 2,291,530 | Cawood | July 28, 1942 |
| 2,423,941 | Laisne | July 15, 1947 |

FOREIGN PATENTS

| 52,221 | France | June 21, 1943 |
| 504,654 | Great Britain | Apr. 28, 1939 |